(12) United States Patent
Honnecke et al.

(10) Patent No.: US 10,434,448 B1
(45) Date of Patent: Oct. 8, 2019

(54) FILTER CABINETS FOR HVAC SYSTEMS

(71) Applicants: Von Honnecke, Lakewood, CO (US); Chase J. Honnecke, Denver, CO (US)

(72) Inventors: Von Honnecke, Lakewood, CO (US); Chase J. Honnecke, Denver, CO (US)

(*) Notice: Subject to any disclaimer, the term of this patent is extended or adjusted under 35 U.S.C. 154(b) by 0 days.

(21) Appl. No.: 15/870,185

(22) Filed: Jan. 12, 2018

Related U.S. Application Data

(63) Continuation of application No. 15/433,655, filed on Feb. 15, 2017, now abandoned, which is a continuation-in-part of application No. 15/074,435, filed on Mar. 18, 2016, now abandoned, which is a continuation-in-part of application No. 14/218,638, filed on Mar. 18, 2014, now abandoned.

(60) Provisional application No. 61/802,897, filed on Mar. 18, 2013.

(51) Int. Cl.
*B01D 46/00* (2006.01)
*F24F 13/28* (2006.01)
*F24H 9/00* (2006.01)

(52) U.S. Cl.
CPC .......... *B01D 46/0006* (2013.01); *F24F 13/28* (2013.01); *F24H 9/0052* (2013.01); *B01D 2279/50* (2013.01)

(58) Field of Classification Search
CPC ................ B01D 46/00; B01D 46/0006; B01D 2279/50; F24F 13/28; F24H 9/0052
USPC .......................................................... 55/481
See application file for complete search history.

(56) References Cited

U.S. PATENT DOCUMENTS

| | | | |
|---|---|---|---|
| 4,773,922 A * | 9/1988 | Ross .................. | B01D 46/0004 55/481 |
| 4,919,123 A | 4/1990 | Jackson et al. | |
| 8,999,029 B1 * | 4/2015 | Brandt ............... | B01D 46/0006 55/484 |

OTHER PUBLICATIONS

"S&H Return Air Box Assembly," https://www.youtube.com/watch?v=_IIkIERrNfY (Dec. 5, 2014) (last visited Mar. 14, 2019). (Year: 2014).*
http://www.flowrightbox.com/assemblyinstructions.html.
Court case No. 1:15 cv 02785 *Brandt et al v. Honnecke and S&H Heating* and AC/Sheet Metal for patent infringement of 8999029.

* cited by examiner

*Primary Examiner* — T. Bennett McKenzie
(74) *Attorney, Agent, or Firm* — Reilly Intellectual Property Law Firm

(57) ABSTRACT

A cabinet for a furnace filter is positioned beneath the base of a forced air furnace system, the cabinet being made up of a base plate, vertical side and end panels joined together to define a generally rectangular housing, one of the end panels having a door way and an upper door panel mounted in the door way and hinged along its lower edge with spring loaded hinges and pivotal side clip members between the door and sides of the door frame or side panels to securely retain the door in a closed position.

4 Claims, 5 Drawing Sheets

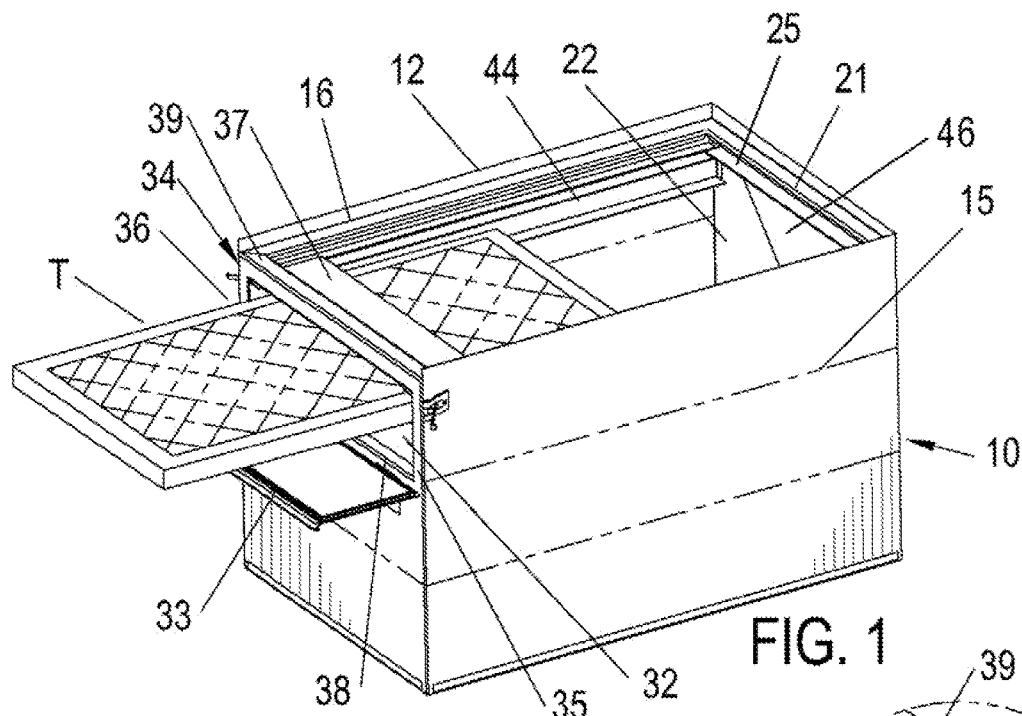

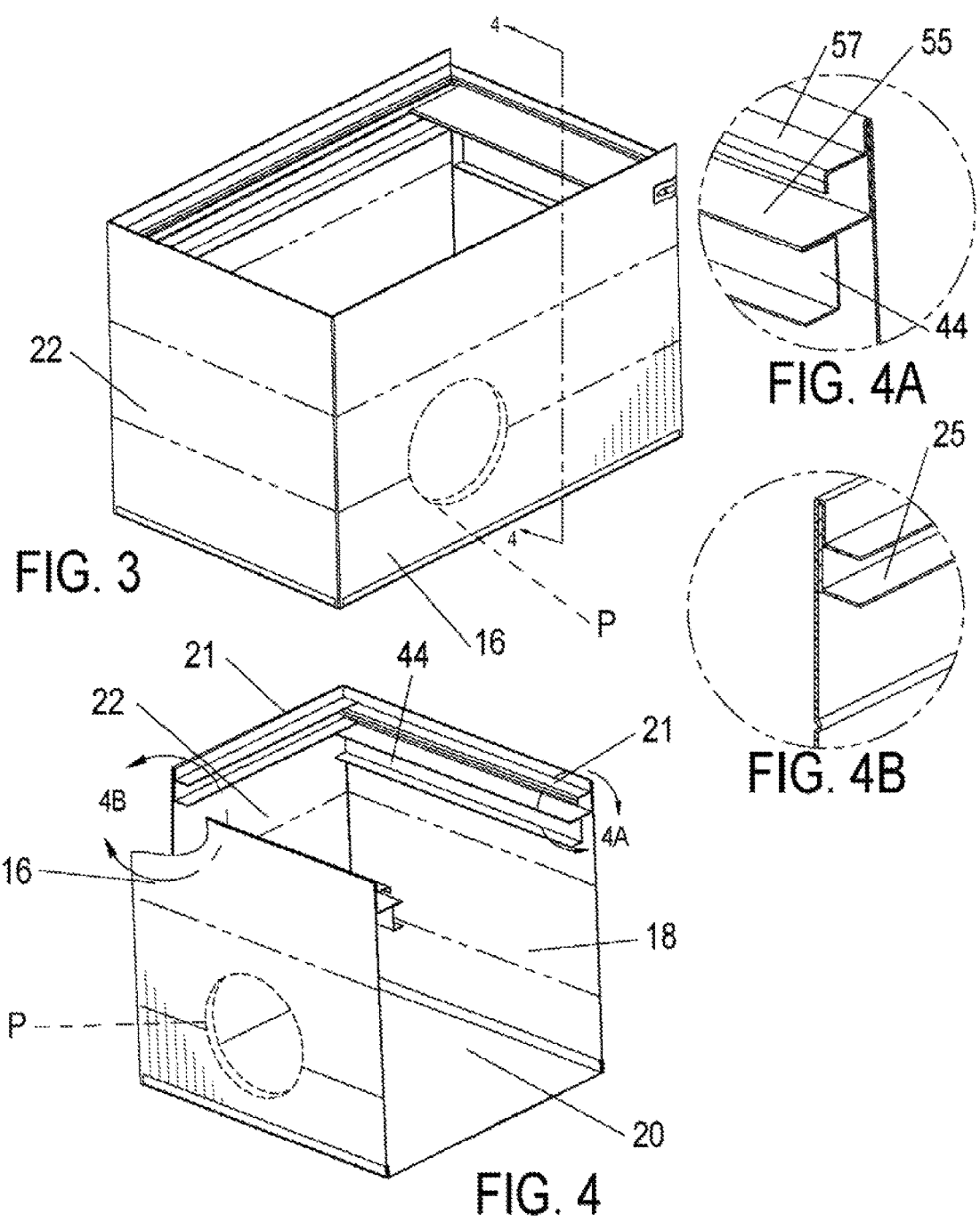

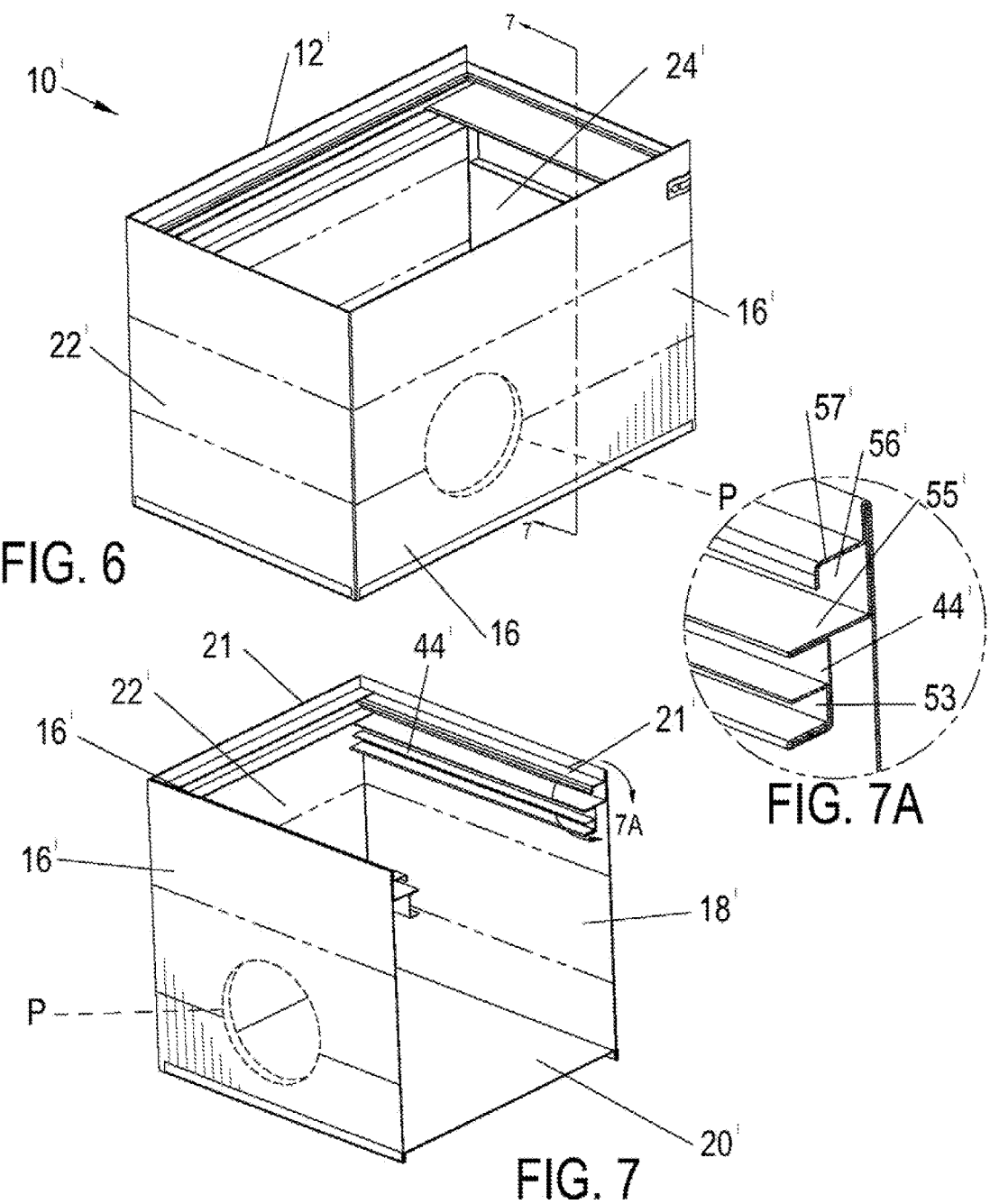

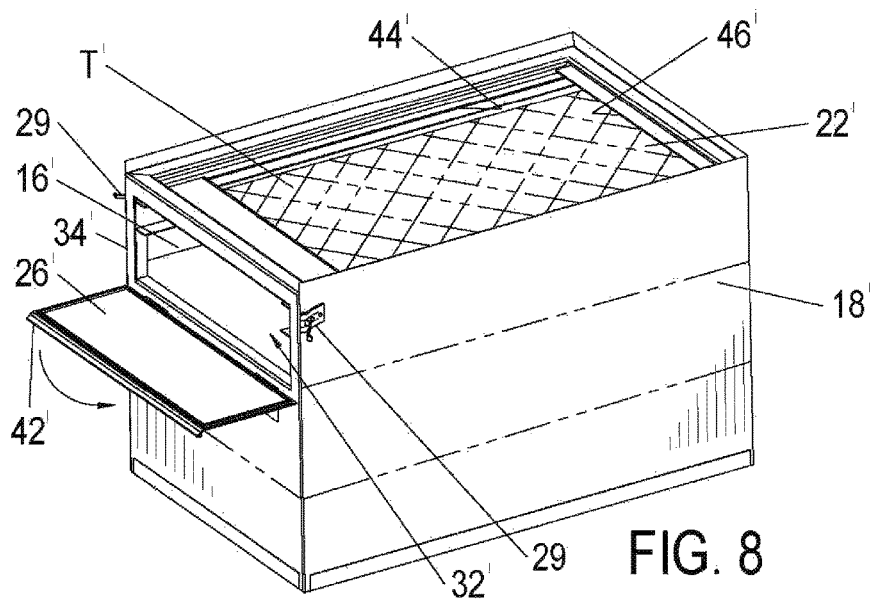
FIG. 8
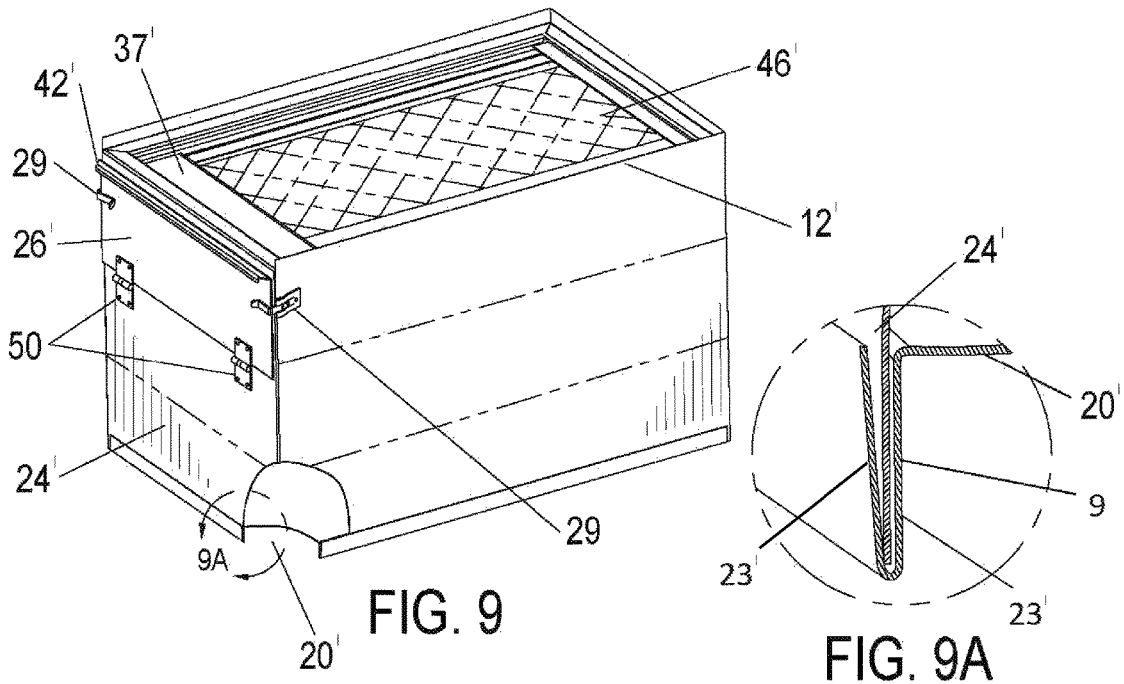
FIG. 9
FIG. 9A

FILTER CABINETS FOR HVAC SYSTEMS

SUMMARY

The following relates to filter cabinets and more particularly relates to a novel and improved filter cabinet to serve as a support and filter housing for forced air furnaces.

In one form there is a breakdown assembly of a filter cabinet for an HVAC or forced air furnace system which is made up of rectangular side and end panels mounted on a base plate with S-clips, a hinged door on one of the end panels to afford access to the interior of the cabinet and being aligned for lengthwise insertion of a furnace filter through aligned horizontal channels along the interior of each side panel and opposite end panel, upper edges of the side and end panels having furnace-seating surfaces and spring-loaded hinges between the lower edge of the door panel and upper edge of the front panel, and a retaining wall extending upwardly from the upper seating surfaces. In another form, the filter cabinet has a bottom plate joined to the lower edges of the side and end panels by generally V-shaped clips, the side and end panels being so connected as to be collapsible, and the door panel is hinged along its bottom edge by standard hinges, and spring loaded pivotal clip members are mounted on the side panels adjacent to opposite sides of the door panel for securely retaining the door panel in a normally closed position against the outer frame of the front end panel.

DETAILED DESCRIPTION OF DRAWINGS

FIG. 1 is a front perspective view of a form of filter cabinet;

FIG. 2 is a front perspective view of the form shown in FIG. 1 with the door panel in a closed position;

FIG. 2A is a cross-sectional view taken through lines 2A-2A of FIG. 2, illustrating the intersection of the front door panel and the front end of the cabinet frame;

FIG. 3 is a rear perspective view of FIG. 1;

FIG. 4 is a cross-sectional view taken about lines 4-4 of FIG. 3;

FIG. 4A is an enlarged, perspective view of the interconnection between the upright panels and filter supports of the assembly;

FIG. 4B is an enlarged, perspective view of the interconnection between the back, upright panel and filter support of the assembly;

FIG. 6 is a rear perspective view of an alternate form of cabinet;

FIG. 7 is a cross-sectional view taken about lines 7-7 of FIG. 6;

FIG. 7A is an enlarged, perspective view of the interconnection between the upright panels and filter supports of the assembly;

FIG. 8 is a front perspective view of an alternate form of filter cabinet;

FIG. 9 is a front perspective view of the form shown in FIG. 8 with the door panel in a closed position; and FIG. 9A is an enlarged, perspective view of the interconnection between the bottom edges of the upright panels and base of the assembly.

DETAILED DESCRIPTION

Figure 5:
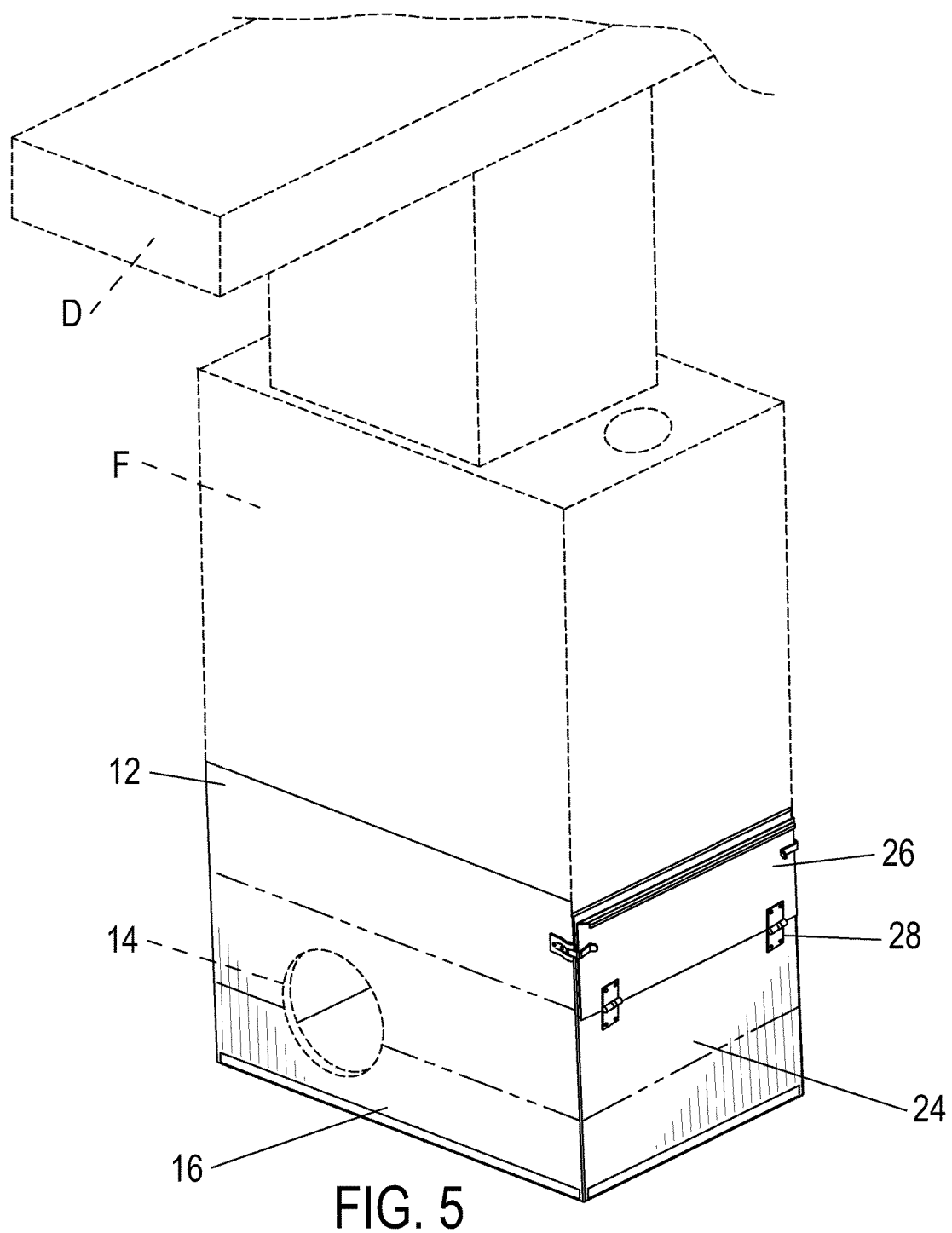
FIG. 5 is a front perspective view from a side opposite to that of FIGS. 1 and 2 illustrating the mounting of a standard furnace on the cabinet.

Referring in more detail to the drawings, there is shown by way of illustrative example in FIG. 5 the mounting of a standard forced air furnace F on a first form of a filter cabinet 10. The upper edge of the cabinet 10 is dimensioned to conform to the size and configuration of the bottom of the furnace so that the furnace can be firmly seated inside of a retaining wall 12 which projects upwardly from the upper side and rear panels of the cabinet 10. In addition, an opening or port P may be provided in one of the side panels as shown in FIG. 3 for the introduction of fresh or return air into the interior of the cabinet for upward passage through a filter into the interior of the furnace in a conventional manner. It is important to note that the cabinet 10 may also be situated along a side opening on the furnace (not shown) instead of beneath a furnace and perform in the same manner as described herein.

A first form of the cabinet 10 is illustrated in FIGS. 1-4B and is broadly comprised of elongated rectangular side panels 16 and 18 of corresponding size extending upwardly from a common bottom panel 20 and joined to a square or rectangular end or rear panel 22 which also extends upwardly from the rear edge of the bottom panel 20. The vertical panels 16, 18, 22 and front panel 24 are joined in close fitting engagement with joint means consisting of upright flanges (not shown) on the bottom plate 20. This method of joinder facilitates a cabinet construction which may be of the knockdown type so that the four upright panels 16, 18, 22 and 24 along with the bottom panel 20 can be sandwiched together in shipping then assembled at the site. The vertical panels terminate in upper flat ends 21 of the panels 16, 18 and 22 to assure a firm seated engagement with the furnace. The upper flat ends 21 provide reinforcement and prevent collapse of the filter box by virtue of the weight of the furnace and wherein upper edges of the side panels and end panels have inwardly directed support surfaces for the furnace. The rear panel 22 is of the same height as the side panels 16 and 18 and is joined together along its abutting edges or corners with the side panel as well as the bottom panel. In this regard, the panels 16, 18, 20 and 22 are of sheet metal construction including stiffening ribs 15 that run horizontally along the panels and contribute to the integrity of the panels to prevent buckling. The panels are joined together at their edges by well-known nesting seam construction or welding techniques.

A front panel 24 is of rectangular configuration including stiffening ribs 15 and of a width corresponding to the rear panel but shorter than the rear panel and is permanently joined along its side edges to the side panels 16, 18 and bottom panel 20 in the manner described previously. A door panel 26 is pivotally connected along its lower edge to the upper edge of the front panel 24 preferably by means of hinges in the form of Snap Latches 28 which are manufactured and sold by Ludwig Mfg. in Racine, Wis. Spring loaded hinges or regular hinges may be used. The door panel 26 is dimensioned to cover and to slightly overlap the entrance 32 above the front panel 24, the entrance 32 having an outer rectangular frame 34 and the opening itself is dimensioned for insertion of at least a standard filter T which conforms to the specifications of each furnace manufacturer. Generally, the entrance 32 is oversized to allow easy accessibility and accommodate various dimensions of filters. Typically, the filter may either be of the disposable variety or a reusable filter which must be periodically removed for cleaning purposes.

The frame 34 is of sheet metal construction and made up of vertical side frame members 35, 36 and upper and lower horizontal frame members 37 and 38. A detail of the frame members is illustrated in FIG. 2A which shows the upper frame member 37 having a vertical face 40 at the leading edge of the frame 37 with an upper return portion 39 and a lower horizontal extension 37 over the front ends of the channel members 44. The door panel 26 again is mounted and hinged in offset relation to the front panel 24 by means of the hinge members 28 between the lower end of the door panel 26 and front panel 24. The door panel 26 also is of sheet metal construction and terminates in an upper curved return 42 which bends in a direction away from the frame surface 38. The upper return 42 serves the dual purpose of forming a closure along the upper frame member 37 and as a handle which can be grasped with the fingers to open and close the door panel without danger of being pinched or wedged between the door panel 26 and frame 37. A rubber gasket or seal 33 is interposed between the upper edge of the door panel 26 and face 38.

As shown in FIGS. 1 and 2, a standard rectangular furnace filter T is advanced horizontally through the entrance 32 and through generally U-shaped guideways or channel members 44 extending horizontally along each inner wall of the side panels 16 and 18 and a U-shaped end guideway or rear channel 25, shown in FIG. 4B, aligned with the channels 44 along the inner wall of the end panel 22. Channel 44 is offset from upper flat ends 21 to prevent the filter T from being pulled into the furnace F and provide air space and air flow between the furnace F and the filter T. The channel 44 may be of varying widths to accommodate different thicknesses of the filters T. A detail of the channel/guideway is illustrated in FIG. 4A which shows the guideway 44 extending vertically from horizontal platform 55 having a vertical face 56 forming a lower end of the retaining wall 12 with an upper return portion 21. The channels 44 and 25 may be of different widths to accommodate different filter thicknesses which are typically either 1" or 2" thick.

In use, return air for the furnace F is drawn into the cabinet through a side opening P, as illustrated in FIGS. 3 and 4, and will continue upwardly through the filter T as illustrated in FIGS. 1 and 2. The upward flow of air through the cabinet will create sufficient vacuum to retain the door panel 26 in a closed position particularly with the cooperation of the spring hinges 28. In addition, the side channels 44 extend the full length of the side panels 16 and, in cooperation with the extension plate 37, serve as a guide for insertion of the filter through the door opening. As noted earlier, the door panel 26 and in particular its upper handle 42 which extends the width of the panel 26 permits the panel 26 to be opened and closed without pinching or cutting one's fingers. In particular, the overall construction of the cabinet with the upper retaining wall 12 in cooperation with the upper flat ends 21 of the panels 16 and 22, defined by inwardly directed support surfaces to assure a firm seated engagement with the furnace by virtue of the weight of the furnace. The cabinet dimensions will necessarily vary to accommodate different furnace sizes. Further, it will be apparent that the cabinet construction may be of the knockdown type as hereinafter described in so as to permit assembly at the site.

In another form of a filter cabinet 10', like parts to those of FIGS. 1 to 5 are correspondingly enumerated with prime numbers. Referring to FIGS. 6, 7 and 7A, the second form of a filter cabinet 10' conforms to the size and configuration of the bottom or side of a furnace, for example, as illustrated in FIG. 5 with the furnace F seated inside of retaining wall 12' extending upwardly from the side panel 16' and 18' along with rear panel 22' and front panel 24'. As shown, an opening or port P may be provided in one of the side panels, front or back panels in the same manner as shown in FIG. 5 to introduce fresh or return air into the interior of the cabinet 10' for upward passage through a filter T' into the furnace interior.

As illustrated in FIGS. 6 and 7, the side panels 16' and 18' are of elongated rectangular configuration and of a corresponding size extending upwardly from bottom panel 20' and are joined to the rectangular rear panel 22' which extends upwardly from the bottom panel 20'. The rear panel 22' corresponds in height to that of the side panels 16' and 18' and is joined along its abutting edges or corners with the side panels 16' and 18' by suitable snap or button locks along the corners, not shown. As in the first form, the front panel 24' is of rectangular configuration having a width corresponding to the rear panel 22' but shorter than the rear panel 22'. The front panel 24' is joined as previously described along its side edges to the side panels 16' and 18'. The side panels 16' and 18' as well as the rear panel 22' and front panel 24' have upper edges that terminate in upper flat ends 21' to assure a firm seated engagement with the furnace. The upper flat ends 21' provide reinforcement and prevent collapse of the filter box by virtue of the weight of the furnace.

Again, a door panel (not shown) is pivotally connected along its lower edge to the upper edge of the front panel 24' by means of hinges which permit the door panel to swing freely down and away from the doorway for insertion of the filter T' by horizontal sliding advancement through guideways 44' and removable railracks 53 which are generally inverted E-shaped channel members extending along the greater length of each inner wall of the side panels 16' and 18' and are mounted along an inside of an upper portion of the first and second side panels and offset from upper flat ends 21' to prevent the filter of filter frame T' from being pulled into the furnace F. The guideways 44' and railracks 53 including a horizontal top wall 55', are formed to bias in tight fitment against a lateral top wall of a filter frame T' when pressurized in an upward airflow condition, and lower filter frame rails 53 are adapted for holding the furnace filter frame T' along the bottom surface edges of the filter frame T'. An enlarged open plenum 46' along a top portion of the filter box provides air space and air flow between the furnace F and the filter T', thereby creating an air plenum between the furnace intake opening and the filter rack horizontal top wall covering the open top.

Channels 44' also act as guideways for larger (approximately 2 inch) filters. Since the railracks 53 are removable, this allows insertion of larger filters within channels 44' while preserving the air plenum 46'. A detail of the guideways is illustrated in FIG. 7A which shows the guideways 44' and removable railracks 53 extending vertically from horizontal platform 55', having a vertical face 56' forming a lower end of the retaining wall 12' and upper flat end 21' with an upper return portion 57'.

Referring to FIGS. 8, 9 and 9A, the side panels 16' and 18' are of elongated rectangular configuration and of a corresponding size extending upwardly from bottom panel 20' and are joined to the rectangular rear panel 22' which extends upwardly from the bottom panel 20'. The rear panel 22' corresponds in height to that of the side panels 16' and 18' and is joined along its abutting edges or corners with the side panels 16' and 18' by suitable snap or button locks along the corners, not shown. In this regard, the panels 16', 18', 20' and 22' may be joined together by well-known nesting seam construction or welding techniques. The vertical panels 16', 18', 22' and front panel 24' joined in close fitting engagement with the bottom plate 20' forming upright flanges 23' by means of generally V-shaped clips 9 as shown in FIG. 9A. This method of joinder facilitates a cabinet construction which may be of the knockdown type so that the four upright panels 16', 18', 22' and 24' along with the bottom panel 20' can be sandwiched together for shipping then assembled at the site. The V-shaped clips 9 allow for additional exterior side clearance due to less material required than an S-clip and is more cost effective. Further, the V-shaped clips provide lower offset stand members along the entire length and width of the base so that the base or bottom plate 20' does not rest on the ground in case of the presence of water.

The front panel 24' and rear panel 26' are constructed in a similar manner to the front panel 24 and door panel 26 of the first form. As in the first form, the door panel 26' is connected along its lower edge to the upper edge of the front panel 24' by means of butt hinges 28' which will permit the door panel 26' to pivot downwardly through 180° to rest against the outer surface of the front panel 24'. Side clips 29 are released by pivoting into the open position as shown in FIG. 8 from the closed position; as shown in FIG. 9. One form of clip is spring-loaded into the closed position of FIG. 9, such as, a model manufactured and sold by Ludwig Mfg. of Racine, Wis. But other forms of clips may be used as well.

Again, as in the first form, the door panel 26' is dimensioned to slightly overlap the entrance 32' above the front panel 26', the entrance 32' having an outer rectangular frame 34' with its opening dimensioned for insertion of a standard filter T' which may either be of a disposable variety or reusable and require periodic removal for cleaning purposes.

The frame 34' corresponds to the frame member 34, as shown in FIG. 1A, other than having lower hinges 28' and the side clips 29. Again, the door panel 26' is hinged at its lower end to the front panel 24', and the door panel 26' terminates along its upper edge in an upper curved return 42' which bends away from the panel 26' to form a gripping member or handle. A rubber gasket or seal 33' may be interposed between the door panel 26' and face 38'.

In use, this form can be of the knockdown type and assembled as previously described, and the cabinet dimensions will vary to accommodate difference furnace sizes in order to conform to the size and configuration of the bottom of the furnace when seated inside of the retaining wall 12'. Also, the vacuum created by upward flow of air through the cabinet will assist in retaining the door panel 26' in a closed position in cooperation with the hinges 28'.

Although several forms are herein set forth and described, the above and other modifications and changes may be made as well as their intended application for uses other than described without departing from the spirit and scope of the present apparatus.

We claim:

1. A breakdown furnace filter housing assembly for use as a three-dimensional self-standing structure, comprising:
    a base member, generally rectangular vertical side panels and a pair of opposite, generally rectangular end panels joined to define a generally rectangular housing;
    said base member having upwardly directed flanges;
    wherein said end panels and said side panels are joined in engagement to said upwardly directed flanges;
    a first of said end panels having a doorway and a door panel mounted in said doorway for movement between an open and closed position with respect to said doorway, wherein said first end panel comprises a sheet material comprising an upper frame member, a lower frame member and side frame members connecting the upper and lower frame members wherein the doorway is formed between the upper, lower and side frame members;
    a pair of horizontal guideways mountable along an interior of said side panels, said horizontal guideways each comprising a horizontal top wall and a lower filter frame rail;
    said horizontal guideways extending an entire length of interior surfaces of said side panels; and
    an open plenum between said horizontal top wall and a top portion of said filter housing.

2. The housing assembly according to claim 1 wherein said horizontal top walls are formed to engage with a lateral top wall of a filter frame when pressurized in an upward airflow condition, and said lower filter frame rails are adapted for holding the furnace filter frame along bottom surface edges of the filter frame.

3. The housing assembly according to claim 1 wherein a horizontal extension plate is mounted above said horizontal guideways adjacent to an upper edge of said doorway, and wherein said door panel includes an upper curved hand grip along an upper edge of said door panel.

4. A knockdown furnace filter cabinet assembly comprising:
    a base plate of generally rectangular configuration, rectangular side panels and opposite end panels joined together to define a filter cabinet; wherein said base plate comprises upwardly directed flanges extending in engagement with said side panels and said end panels;
    one of said end panels comprises a sheet material comprising an upper frame member, a lower frame member and side frame members connecting the upper and lower frame members wherein a doorway is formed between the upper, lower and side frame members and a hinged door attached to the doorway;
    a pair of horizontal furnace filter guideways, mounted to an inside of an upper portion of said side panels, said guideways extending an entire length of said end panels; and
    upper edges of said side and end panels comprising furnace-seating surfaces and a forward extension plate interposed between said seating surfaces and said channels.

* * * * *